US008274615B2

(12) United States Patent
Vitito

(10) Patent No.: US 8,274,615 B2
(45) Date of Patent: Sep. 25, 2012

(54) MOBILE VIDEO SYSTEM

(75) Inventor: Christopher J. Vitito, Celebration, FL (US)

(73) Assignee: Audiovox Corporation, Hauppauge, NY (US)

( * ) Notice: Subject to any disclaimer, the term of this patent is extended or adjusted under 35 U.S.C. 154(b) by 1015 days.

(21) Appl. No.: 12/044,062

(22) Filed: Mar. 7, 2008

(65) Prior Publication Data
US 2009/0225238 A1 Sep. 10, 2009

(51) Int. Cl.
*H04N 5/72* (2006.01)
(52) U.S. Cl. .................. 348/837; 296/37.16; 725/77
(58) Field of Classification Search .......... 348/836–843; 361/697.06, 697.21, 697.22, 697.01, 807, 361/679.06, 679.21, 679.22, 679.01; 725/74–85; 296/37.8, 37.14, 37.16
See application file for complete search history.

(56) References Cited

U.S. PATENT DOCUMENTS

| | | | |
|---|---|---|---|
| 4,681,366 A | 7/1987 | Lobanoff | |
| 5,161,028 A * | 11/1992 | Kawata et al. | 348/837 |
| 5,173,686 A | 12/1992 | Fujihara | |
| 5,267,775 A | 12/1993 | Nguyen | |
| 5,507,556 A | 4/1996 | Dixon | |
| 5,842,715 A | 12/1998 | Jones | |
| 5,847,685 A | 12/1998 | Otsuki | |
| D418,831 S | 1/2000 | Rosen et al. | |
| 6,250,694 B1 | 6/2001 | Weiland | |
| 6,292,076 B1 * | 9/2001 | DeGrazia et al. | 335/202 |
| 6,663,155 B1 * | 12/2003 | Malone et al. | 296/37.8 |
| 6,669,260 B2 | 12/2003 | Clark et al. | |
| 6,702,238 B1 | 3/2004 | Wang | |
| 6,712,321 B1 | 3/2004 | Su et al. | |
| 6,719,337 B1 | 4/2004 | Ji | |
| 6,926,329 B2 * | 8/2005 | Neumann et al. | 296/24.34 |
| 7,036,787 B1 | 5/2006 | Lin | |
| 7,044,423 B2 * | 5/2006 | Bober et al. | 248/188.4 |
| 7,090,186 B2 | 8/2006 | Quinno et al. | |
| 7,124,984 B2 * | 10/2006 | Yokouchi et al. | 248/125.8 |
| 7,159,828 B1 | 1/2007 | Yau et al. | |
| 2003/0226148 A1 | 12/2003 | Ferguson | |
| 2004/0145684 A1 | 7/2004 | Albert et al. | |
| 2005/0110310 A1 * | 5/2005 | Mayer et al. | 297/188.06 |
| 2005/0184215 A1 | 8/2005 | Lin | |
| 2006/0242671 A1 * | 10/2006 | Vitito | 725/75 |
| 2007/0194182 A1 | 8/2007 | Lee | |

FOREIGN PATENT DOCUMENTS

| | | |
|---|---|---|
| FR | 2817812 | 6/2002 |
| JP | 63-219289 | 9/1988 |
| JP | 09-224202 | 8/1997 |

* cited by examiner

*Primary Examiner* — William Gilbert
*Assistant Examiner* — Theodore Adamos
(74) *Attorney, Agent, or Firm* — F. Chau & Associates, LLC

(57) ABSTRACT

A mobile video system includes a housing having a front surface and a rear surface. The housing is shaped and dimensioned for attachment to a rear surface of a back support portion of an vehicle seat, wherein the housing includes a rear surface that is provided with coupling members shaped and dimensioned for attachment to the back support portion of the vehicle seat. A video monitor and a video source are supported within the housing. The video monitor is mounted within the housing for movement between an exposed orientation in which it is positioned above the housing and a storage position in which it is positioned within the housing for protection from the external environment.

15 Claims, 5 Drawing Sheets

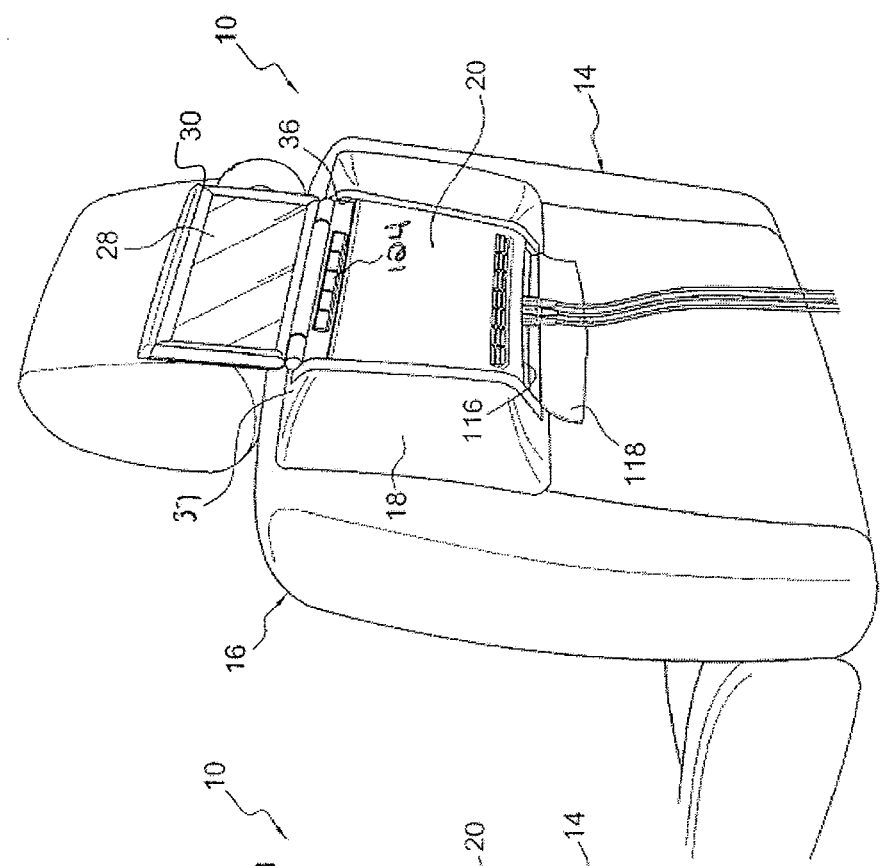
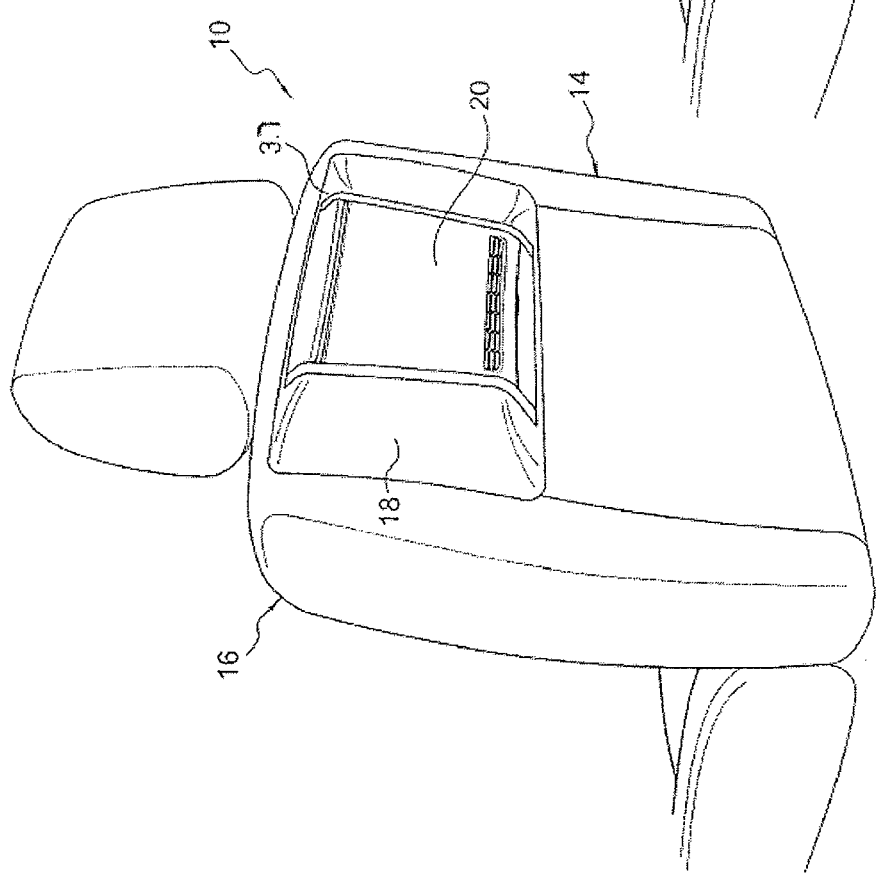

MOBILE VIDEO SYSTEM

BACKGROUND OF THE INVENTION

1. Field of the Invention

The invention relates to mobile video systems. More particularly, the invention relates to a mobile video system shaped and dimensioned for attachment to the rear surface of the back support portion of an automobile seat.

2. Description of the Related Art

Entertainment systems for automobiles are well known. Many advances have been made in the development of entertainment systems that make the otherwise tedious task of riding in an automobile bearable. In addition to the development of overhead systems, pioneered by the present inventor, systems that mount to the seat headrest of the automobile have also been developed.

Safety advances have, however, made it difficult to incorporate video systems directly within the headrest of some automobiles. As such, a need currently exists for mobile video systems allowing for seat mounting without adversely affecting the safety features incorporated into the automobile seat. The present invention provides such a mobile video system.

SUMMARY OF THE INVENTION

It is, therefore, an object of the present invention to provide a mobile video system including a housing having a front surface and a rear surface. The housing is shaped and dimensioned for attachment to a rear surface of a back support portion of an vehicle seat, wherein the rear surface of the housing is provided with coupling members shaped and dimensioned for attachment to the back support portion of the vehicle seat. A video monitor and a video source are supported within the housing. The video monitor is mounted within the housing for movement between an exposed orientation in which it is positioned above the housing and a storage position in which it is positioned within the housing for protection from the external environment.

It is also an object of the present invention to provide a mobile video system wherein the video monitor is mounted upon a support structure in a manner permitting selective movement between the exposed orientation and the storage position.

It is another object of the present invention to provide a mobile video system wherein the support structure includes a spring biased elevation assembly.

It is a further object of the present invention to provide a mobile video system wherein the support structure includes a C-shaped support bracket including a central bracket member which is rigidly secured to the mounting structure within the housing. The central bracket member includes a first side edge and a second side edge, and a first flange member extends from the first side edge of the central bracket member and a second flange member extends from the second side edge of the central bracket member.

It is also an object of the present invention to provide a mobile video system wherein each of the first flange member and the second flange member includes an inner surface to which respective first track members and second track members are secured for supporting a slide member.

It is another object of the present invention to provide a mobile video system wherein the slide member includes a slide base having a first guide member and a second guide member extending therefrom. The first guide member and the second guide member are seated within the respective first track member and second track member of the first flange member and the second flange member.

It is a further object of the present invention to provide a mobile video system wherein each of the first guide member and the second guide member is spring biased in a manner urging the slide member to a position adjacent a first end of the respective first track member and second track member.

It is also an object of the present invention to provide a mobile video system wherein the first guide member is spring biased in a manner urging the slide member to a position adjacent a first end of the first track member.

It is also an object of the present invention to provide a mobile video system wherein the first guide member includes a rotating first support arm to which a first end of the spring is secured, and the spring is wrapped about the first support arm such that a second end of the spring is secured to the central bracket member at a position adjacent the first end of the first track member. When the slide member is forced toward the second end of the first track member, the spring is unrolled from its position about the first support arm creating a bias urging the slide member back toward the first end of the first track.

It is another object of the present invention to provide a mobile video system wherein a push/push retaining member selectively retains the slide member adjacent the respective second ends of the first track member and the second track member to hold the slide member in position adjacent the respective second ends of the first track member and the second track member until such a time that a user applies downward pressure to the top of the video monitor.

It is a further object of the present invention to provide a mobile video system wherein the slide member further includes a video monitor mounting bracket supporting the video monitor, and the video monitor mounting bracket includes a hinge allowing one to selectively reorient the video monitor in a desired orientation when the video monitor is moved to its exposed orientation.

It is also an object of the present invention to provide a vehicle including a mobile video system as described above.

Other objects and advantages of the present invention will become apparent from the following detailed description when viewed in conjunction with the accompanying drawings, which set forth certain embodiments of the invention.

BRIEF DESCRIPTION OF THE DRAWINGS

FIGS. 4A and 4B are perspective views of the mobile video system respectively in its storage orientation and in its use orientation.

DESCRIPTION OF THE PREFERRED EMBODIMENT

Figure 1:
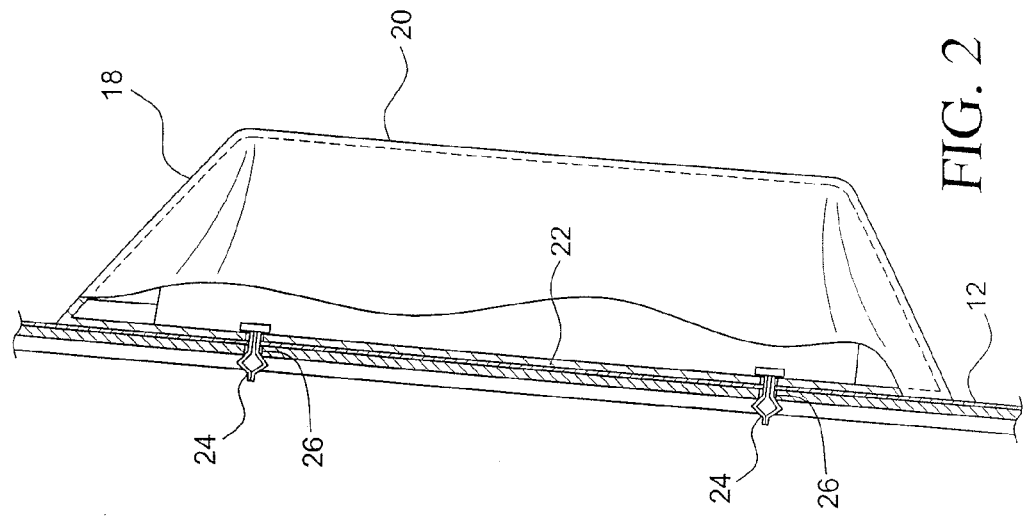
FIG. 1 is a perspective view of the present mobile video system.
Figure 2:
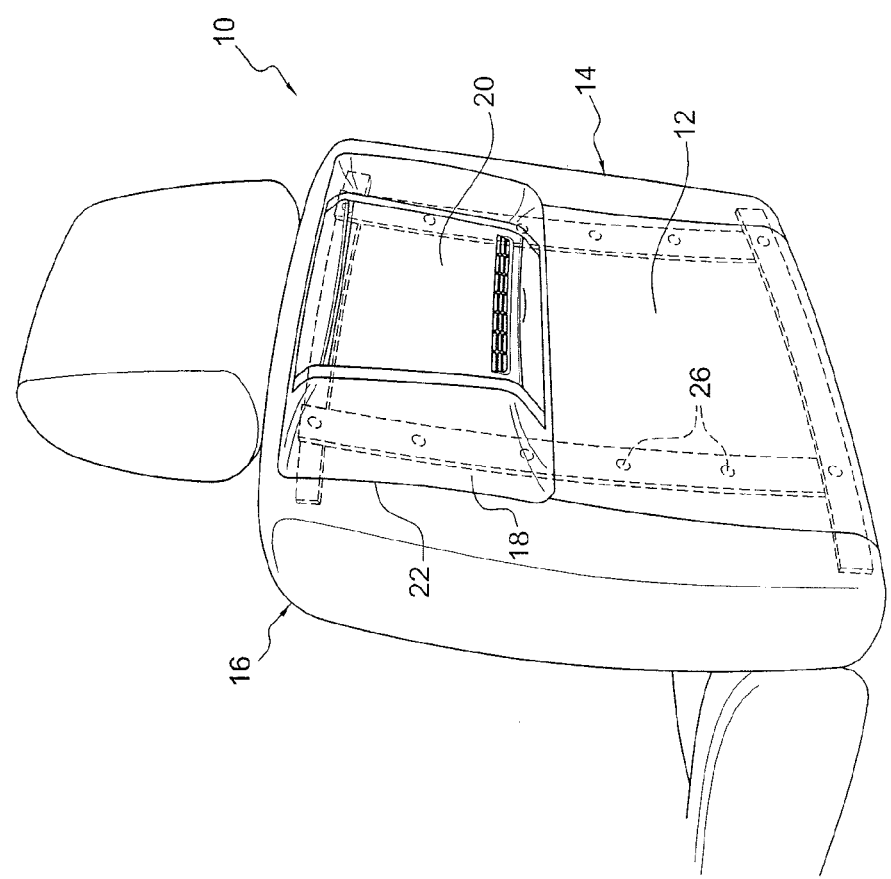
FIG. 2 is a cross sectional view of the mobile video system shown in FIG. 1.
Figure 3:
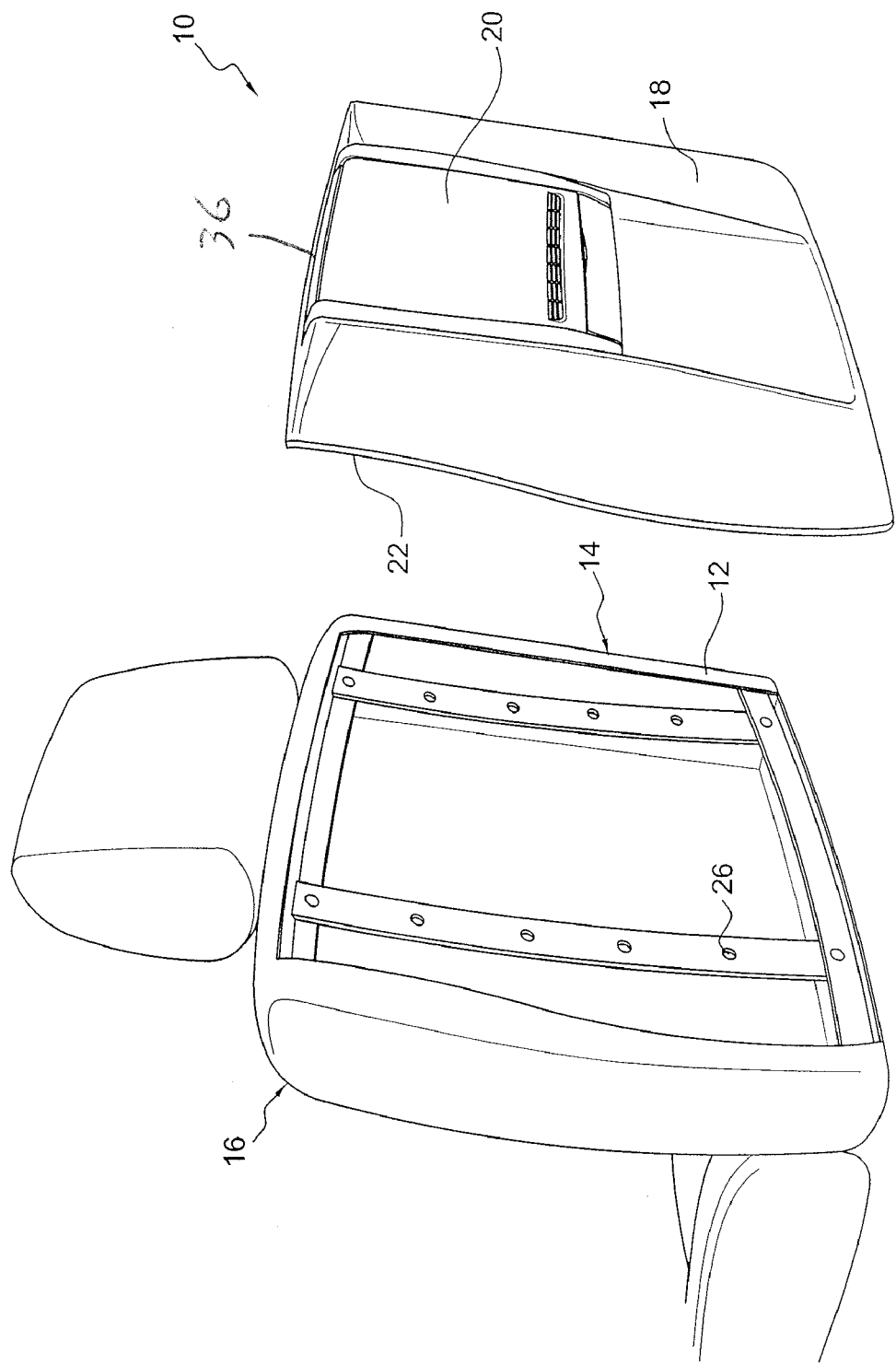
FIG. 3 is an exploded view with the mobile video system detached from an automobile seat.

The detailed embodiment of the present invention is disclosed herein. It should be understood, however, that the disclosed embodiment is merely exemplary of the invention, which may be embodied in various forms. Therefore, the details disclosed herein are not to be interpreted as limiting, but merely as a basis for teaching one skilled in the art how to make and/or use the invention.

In accordance with the present invention, and with reference to FIGS. 1 to 6, a mobile video system 10 is disclosed in accordance with the present invention. The mobile video system 10 is shaped and dimensioned for attachment to the rear surface 12 of the back support portion 14 of a standard automobile seat 16. Although the present mobile video system is disclosed herein for use in conjunction with an automobile seat, it could certainly be used in a variety of vehicles, for example aircrafts or boats, without departing from the spirit of the present invention.

The mobile video system 10 includes a housing 18 having a front surface 20 and a rear surface 22. As those skilled in the art will certainly appreciate, the attachment structure may take a variety of forms known to those skilled in the art. However, and in accordance with a preferred embodiment of the present invention, the rear surface 22 of the housing 18 is provided with coupling members 24 for attachment to the rear surface 12 along the back support portion 14 of the automobile seat 16. More particularly, the rear surface 22 of the housing 18 includes a series of coupling members 24 shaped and dimensioned to engage coupling members 26 along the back support portion 14 of a standard automobile seat 16. It is further contemplated the rear surface of the housing may be secured directly to the support brackets of the back support portion of the automobile seat with the rear surfacing of the back support portion removed and substantially replaced by the housing of the present mobile video system.

Within the housing 18 are positioned a video monitor 28, a video source 30 and other electronic components. The video monitor 28 is mounted within the housing 18 for movement between an exposed orientation in which it is positioned above the housing 18 (see FIG. 4B) and a storage position in which it is positioned within the housing 18 for protection from the external environment (see FIG. 4A).

Figure 5:
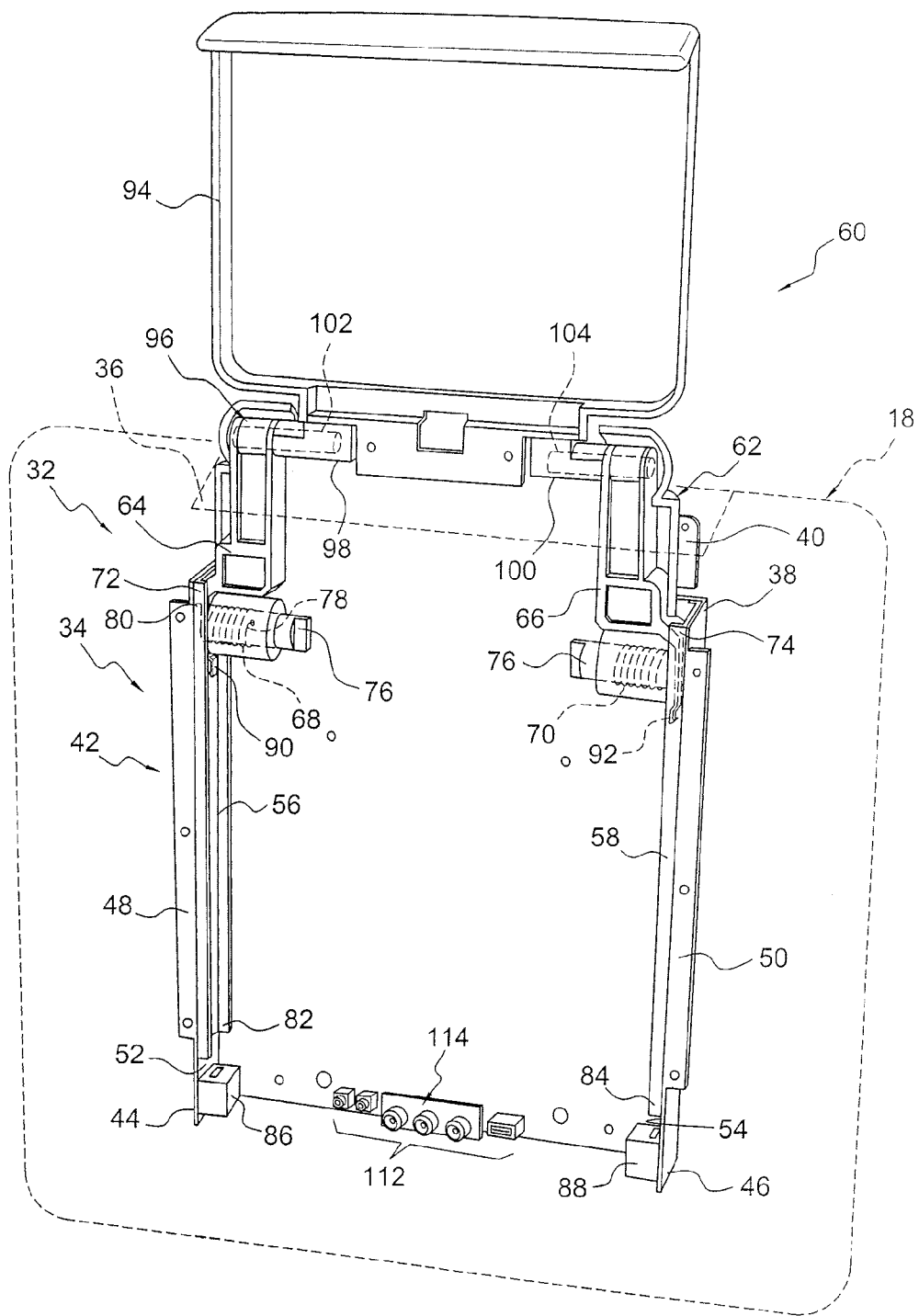
FIG. 5 is a detailed perspective view of the support structure for the video monitor.
Figure 6:
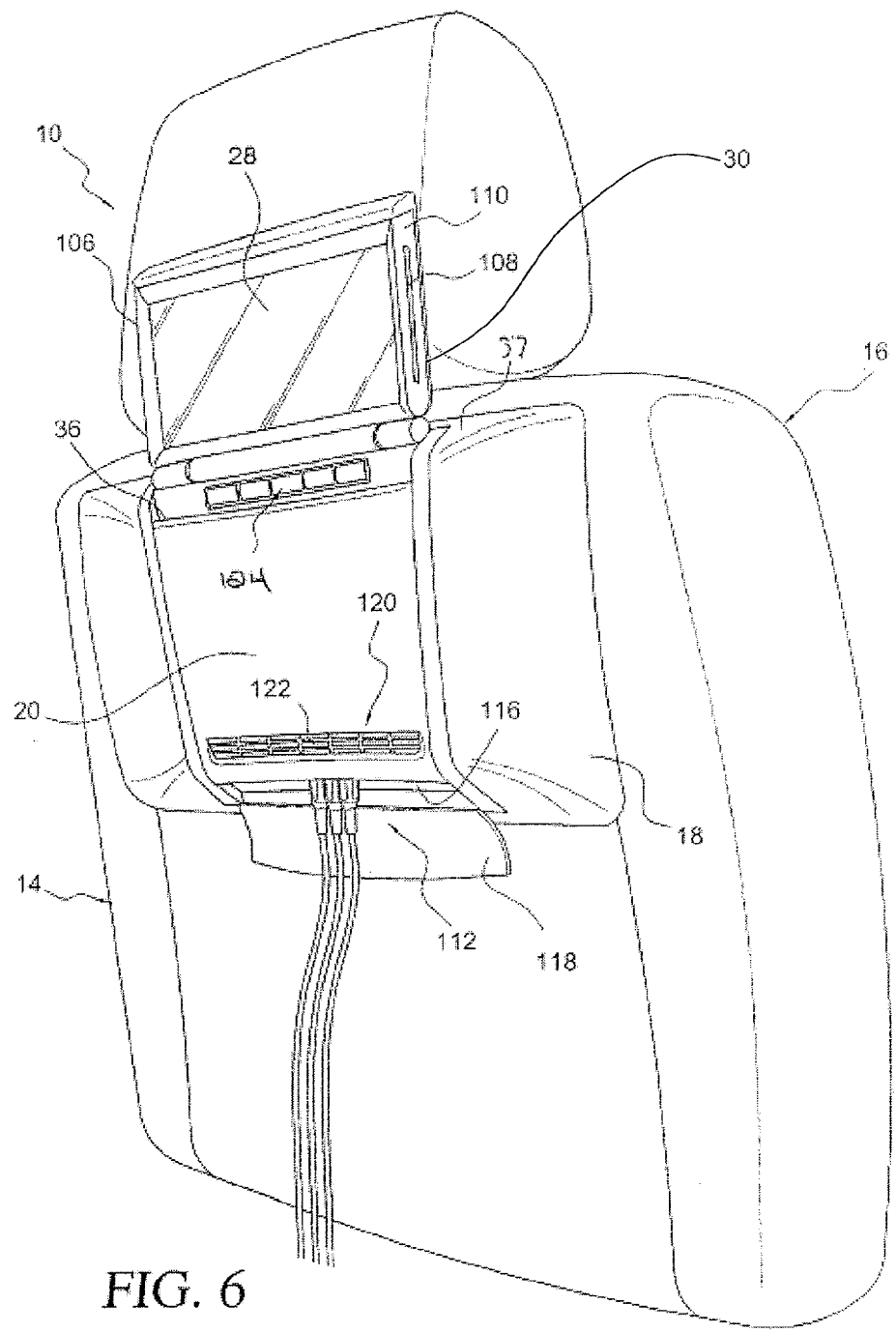
FIG. 6 is a detailed perspective view of the mobile video system.

Referring to FIG. 5, and in accordance with a preferred embodiment of the present invention, the video monitor 28 is mounted upon a support structure 32 in a manner permitting selective movement between an exposed orientation and a storage position. As will be appreciated based upon the following disclosure, movement of the video monitor 28 between the exposed orientation and the storage position is controlled by a spring biased elevation assembly 34. However, as those skilled in the art will appreciate, other support mechanism may be employed without departing from the spirit of the present invention.

The video monitor 28 is securely stored within the housing 18 while in its storage position. When in its storage position, the video monitor 28 is accessed via an opening 36 formed along the upper end 37 of the housing 18. In practice, and as will be appreciated based upon the following disclosure, the video monitor 28 moves through the U-shaped opening 36 in the upper end 37 of the housing 18 permitting use thereof as the video monitor 28 moves between its storage position and its exposed orientation.

The support structure 32 of the elevation assembly 34 includes a C-shaped support bracket 38. The C-shaped support bracket 38 is secured to mounting structure 40 within the housing 18. The C-shaped support bracket 38 includes a central bracket member 42 which is rigidly secured to the mounting structure 40 within the housing 18. The central bracket member 42 includes a first side edge 44 and a second opposite side edge 46. A first flange member 48 extends from the first side edge 44 of the central bracket member 42 (in accordance with a preferred embodiment at approximately a 90 degree angle relative to a plane in which the central bracket member 42 lies) and a second flange member 50 extends from the second side edge 46 of the central bracket member 42 (in accordance with a preferred embodiment at approximately a 90 degree angle relative to a plane in which the central bracket member 42 lies). Each of the first flange member 48 and the second flange member 50 includes an inner surface 52, 54 (that is, the surface of the respective first and second flange members 48, 50 which faces the enclosed portion of the C-shaped support bracket 38) to which respective first and second track members 56, 58 are secured for supporting a slide member 60.

The slide member 60 includes slide base 62 having first and second guide members 64, 66 extending therefrom. The first and second guide members 64, 66 are seated within the respective first and second track members 56, 58 of the first and second flange members 48, 50. Each of the first and second guide members 64, 66 is biased by a spring 68, 70 in a manner urging the slide member 60 to a position adjacent a first end 72, 74 of the respective first and second track members 56, 58 (where the video monitor 28 is placed in its exposed orientation). More particularly, and with reference to the first guide member 64 (the second guide member 66 is identical), the first guide member 64 includes a rotating first support arm 76 to which a first end 78 of the spring 68 is secured. The spring 68 is wrapped about the first support arm 76 such that the second end 80 of the spring 68 is secured to the central bracket member 42 at a position adjacent the first end 72 of the first track member 56. The remainder of the spring 68 is wrapped about the first support arm 76. As a result, when the slide member 60 is forced toward the second end 82 of the first track member 56, the spring 68 is unrolled from its position about the first support arm 76 creating a bias urging the slide member 60 back toward the first end 72 of the first track member 56.

Despite the urging of the springs 68, 70 secured to the first and second guide members 64, 66, the slide member 60 is selectively retained adjacent the second ends 82, 84 of the first and second track members 56, 58 by first and second push/push retaining members 86, 88 which engage respective first and second detents 90, 92 extending downwardly from the first and second guide members 64, 66. Push/push retaining members are well known to those skilled in the art, and retaining members such as those disclosed in U.S. Pat. No. 6,250,694, entitled "PUSH-PUSH LATCH", issued Jun. 26, 2001, to Weiland, and U.S. Pat. No. 6,719,337, entitled "PUSH-PUSH LATCH", issued Apr. 13, 2004, to Ji, which are incorporated herein by reference, may be utilized within the spirit of the present invention.

As a result, the slide member 60 is held in position adjacent the second ends 82, 84 of the first and second track members 56, 58 until such a time that a user applies downward pressure to the top of the video monitor 28, which is exposed via the opening 36 in an upper end 37 of the housing 18. The downward pressure will function to release the slide member 60 from the first and second push/push retaining members 86, 88, allowing the slide member 60, and video monitor 28 that is secured to the slide member 60, to move upwardly toward the first ends 72, 74 of the first and second track members 56, 58 under the force supplied by the springs 68, 70. The movement functions to expose the video monitor 28 and move it to its exposed orientation.

The slide member 60 further includes a video monitor mounting bracket 94 for supporting the video monitor 28. The video monitor mounting bracket 94 includes a hinge 96 allowing one to selectively reorient the video monitor 28 in a desired orientation when the video monitor 28 is moved to its exposed orientation. The hinge 96 includes respective flanges 98, 100 along the slide base 62 and the video monitor mounting bracket 94. The flanges 98, 100 are held together with pivot pins 102, 104 which allow for the selective movement of the video monitor mounting bracket 94 (and ultimately the video monitor 28) relative to the slide base 62. As those skilled in the art will certainly appreciate, a variety of hinge structures may be employed without departing from the spirit of the present invention.

In accordance with a preferred embodiment of the present invention, the video monitor 28 includes a monitor housing 106 in which the video source 30, the video monitor 28 and electronic operating components are housed for operation in a manner well known to those skilled in the art. In accordance with a preferred embodiment, the video source 30 is a DVD player. The DVD player is preferably a slot loaded DVD player which is accessed for insertion and ejection of DVDs via a slot opening 108 formed in the sidewall 110 of the monitor housing 106. As a result, a user may readily slide a DVD within the slot opening 108 formed in the monitor housing 106 of the video monitor 28 for access to the DVD player 30. Control of either the video source 30 or the video monitor 28 is achieved via buttons 124 positioned upon the face of the video monitor 28 and/or via a remote control (not shown). Although a slot loaded DVD player is disclosed in accordance with a preferred embodiment of the present invention, those skilled in the art will appreciate the DVD player may be mounted within the monitor in a variety of manners without departing from the spirit of the present invention.

In addition to the video monitor 28 (as well as the video source 30) being mounted within the housing 18 for movement between an exposed orientation and a storage position, electronic accessory components 112 are also stored within the housing 18. In accordance with a preferred embodiment, the electronic accessory components include accessory inputs 114 for game port inputs, USB inputs and wired headphone inputs. The game port inputs, USB inputs and wired headphone inputs are accessed via an access opening 116 formed in the housing 18. The access opening 116 is selectively opened and closed by a cover member 118 which forms part of the housing 18. These inputs 114 are connected to the video monitor 28 in a traditional manner for playing of various external video sources upon the video monitor when a user so desires.

The housing 18 is further provided with a ventilation system 120. The ventilation system 120 includes air intake vents 122 for cooling the electronics of the present mobile video system 10.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A mobile video system, comprising:
a central bracket member disposed in a housing, wherein the central bracket member comprises a first track member and a second track member, and the housing is shaped and dimensioned for attachment to a rear surface of a back portion of a vehicle seat, wherein the housing comprises an opening formed at an upper end shaped and dimensioned to permit access to a video monitor, and an access opening formed at a lower, opposing end of the housing, permitting access to an electrical accessory component operatively coupled to the video monitor,
wherein the upper and lower ends of the housing are disposed in an upper half of the rear surface of the back portion of the vehicle seat;
a slide base comprising a first guide member and a second guide member, wherein the slide base is attached to the video monitor, and the first and second guide members vertically move along the first and second track members, respectively; and
a first retaining member and a second retaining member, wherein the first and second retaining members are configured to engage a first detent disposed on the first guide member and a second detent disposed on the second guide member, respectively, and the first retaining member and the first detent are located opposite the second retaining member and the second detent with respect to the video monitor.

2. The mobile video system according to claim 1, wherein the electrical accessory component is disposed between the first and second track members and is configured to connect an external device to the video monitor.

3. The mobile video system according to claim 1, wherein each of the first guide member and the second guide member is spring biased in a manner urging the slide member to a position adjacent a first end of the respective first track member and second track member.

4. The mobile video system according to claim 1, wherein the first guide member is spring biased in a manner urging the slide member to a position adjacent a first end of the first track member.

5. The mobile video system according to claim 4, wherein the first guide member includes a rotating first support arm to which a first end of the spring is secured, and the spring is wrapped about the rotating first support arm such that a second end of the spring is secured to the central bracket member at a position adjacent the first end of the first track member, wherein when the slide member is forced toward the second end of the first track member, the spring is unrolled from its position about the rotating first support arm creating a bias urging the slide member back toward the first end of the first track member.

6. The mobile video system according to claim 1, wherein the slide member further includes a video monitor mounting bracket supporting the video monitor, and the video monitor mounting bracket includes a hinge allowing one to selectively reorient the video monitor in a desired orientation when the video monitor is moved to its exposed orientation.

7. The mobile video system according to claim 1, further comprising a cover member at the access opening configured to be selectively opened and closed, wherein access to the electrical accessory component is permitted while the cover member is in an opened position, and access to the electrical accessory component is not permitted while the cover member is in a closed position.

8. A mobile video system, comprising:
a housing having a front surface and a rear surface, the housing is shaped and dimensioned for attachment to a rear surface of a back support portion of vehicle seat, wherein the rear surface of the housing is provided with coupling members shaped and dimensioned for attachment to the back support portion of the vehicle seat;
a video monitor and a video source are supported within the housing, the video monitor is mounted within the housing for movement between an exposed orientation in which it is positioned above the housing and a storage position in which it is positioned within the housing for protection from an external environment;

a support structure comprising a central bracket member disposed within the housing, wherein the central bracket member includes a first side edge, a second side edge, a first flange member extending from the first side edge, and a second flange member extending from the second side edge;

a first track member disposed on an inner surface of the first flange member and a second track member disposed on an inner surface of the second flange member;

a slide member comprising a slide base having a first guide member and a second guide member extending therefrom, wherein the first and second guide members are seated within the first and second track members, respectively;

a first retaining member and a second retaining member, wherein the first and second retaining members are configured to engage a first detent disposed on the first guide member and a second detent disposed on the second guide member, respectively, and the first retaining member and the first detent are located opposite the second retaining member and the second detent with respect to the video monitor; and an electrical accessory component disposed between the first and second retaining members and accessible via an opening formed in a bottom surface of the housing, wherein the electrical accessory component is configured to connect an external device to the video monitor.

9. The mobile video system according to claim 8, wherein the video monitor is mounted upon the support structure in a manner permitting selective movement between the exposed orientation and the storage position.

10. The mobile video system according to claim 9, wherein the support structure includes a spring biased elevation assembly.

11. The mobile video system according to claim 8, wherein each of the first guide member and the second guide member is spring biased in a manner urging the slide member to a position adjacent a first end of the respective first track member and second track member.

12. The mobile video system according to claim 8, wherein the first guide member is spring biased in a manner urging the slide member to a position adjacent a first end of the first track member.

13. The mobile video system according to claim 12, wherein the first guide member includes a rotating first support arm to which a first end of the spring is secured, and the spring is wrapped about the rotating first support arm such that a second end of the spring is secured to the central bracket member at a position adjacent the first end of the first track member, wherein when the slide member is forced toward a second end of the first track member, the spring is unrolled from its position about the rotating first support arm creating a bias urging the slide member back toward the first end of the first track member.

14. The mobile video system according to claim 13, wherein the first and second retaining members selectively retain the slide member adjacent respective second ends of the first track member and the second track member to hold the slide member in position adjacent the respective second ends of the first track member and the second track member until such a time that a user applies downward pressure to the top of the video monitor.

15. The mobile video system according to claim 8, wherein the slide member further includes a video monitor mounting bracket supporting the video monitor, and the video monitor mounting bracket includes a hinge allowing one to selectively reorient the video monitor in a desired orientation when the video monitor is moved to its exposed orientation.

* * * * *